United States Patent
Wang et al.

(10) Patent No.: US 12,043,263 B2
(45) Date of Patent: Jul. 23, 2024

(54) AUDIO-BASED TECHNIQUE TO SENSE AND DETECT THE ROAD CONDITION FOR AUTONOMOUS DRIVING VEHICLES

(71) Applicant: Baidu USA LLC, Sunnyvale, CA (US)

(72) Inventors: Wei Wang, Sunnyvale, CA (US); Qi Luo, Sunnyvale, CA (US); Kecheng Xu, Sunnyvale, CA (US); Hongyi Sun, Sunnyvale, CA (US); Wesley Reynolds, Sunnyvale, CA (US); Youling Zou, Sunnyvale, CA (US); Zejun Lin, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 125 days.

(21) Appl. No.: 17/148,254

(22) Filed: Jan. 13, 2021

(65) Prior Publication Data
US 2022/0219704 A1    Jul. 14, 2022

(51) Int. Cl.
| | |
|---|---|
| *B60W 40/068* | (2012.01) |
| *B60W 30/14* | (2006.01) |
| *B60W 60/00* | (2020.01) |
| *G06N 3/08* | (2023.01) |
| *H04R 1/22* | (2006.01) |
| *H04S 7/00* | (2006.01) |

(52) U.S. Cl.
CPC ........ *B60W 40/068* (2013.01); *B60W 30/143* (2013.01); *B60W 60/00184* (2020.02); *G06N 3/08* (2013.01); *H04R 1/222* (2013.01); *H04S 7/40* (2013.01); *B60W 2420/54* (2013.01); *B60W 2422/70* (2013.01); *B60W 2552/05* (2020.02); *B60W 2552/35* (2020.02); *B60W 2552/40* (2020.02)

(58) Field of Classification Search
CPC ............ B60W 40/068; B60W 30/143; B60W 60/00184; B60W 2420/54; B60W 2422/70; B60W 2552/05; B60W 2552/35; B60W 2552/40; G06N 3/08; H04R 1/222; H04S 7/40
See application file for complete search history.

(56) References Cited

U.S. PATENT DOCUMENTS

| | | | | |
|---|---|---|---|---|
| 6,062,659 | A  * | 5/2000 | Matsuda | B60T 7/12 |
| | | | | 701/80 |
| 6,223,108 | B1 * | 4/2001 | Izawa | B60G 17/0164 |
| | | | | 280/5.513 |

(Continued)

FOREIGN PATENT DOCUMENTS

| | | |
|---|---|---|
| DE | 102019204609 | 10/2020 |
| EP | 3712020 | 9/2020 |

(Continued)

*Primary Examiner* — Peter D Nolan
*Assistant Examiner* — Anwar Mohamed
(74) *Attorney, Agent, or Firm* — WOMBLE BOND DICKINSON (US) LLP (57) ABSTRACT

Sound signals are received by one or more microphones disposed at an ADV. The sound signals are analyzed to extract a feature of a road on which the ADV is driving. A road condition of the road is determined based on the extracted feature. A path planning and speed planning is performed to generate a trajectory based on the road condition. The ADV is controlled to drive autonomously according to the generated trajectory.

16 Claims, 9 Drawing Sheets

(56) References Cited

U.S. PATENT DOCUMENTS

| | | | |
|---|---|---|---|
| 2004/0258254 A1* | 12/2004 | Mollon | H04R 5/02 |
| | | | 381/86 |
| 2016/0205491 A1* | 7/2016 | Sikora | H04R 3/12 |
| | | | 381/302 |
| 2016/0232542 A1* | 8/2016 | Talmaki | G06Q 30/0202 |
| 2016/0349219 A1* | 12/2016 | Paturle | B60C 23/00 |
| 2017/0369069 A1* | 12/2017 | Yen | B60W 40/09 |
| 2018/0004211 A1* | 1/2018 | Grimm | G06Q 10/047 |
| 2018/0170391 A1 | 6/2018 | Duvernier | |
| 2019/0003852 A1* | 1/2019 | Paturle | G01C 21/26 |
| 2020/0241552 A1* | 7/2020 | Leenayongwut | H04R 3/005 |
| 2020/0319638 A1 | 10/2020 | Bowen | |
| 2021/0097786 A1* | 4/2021 | LaBarbera | B60W 10/20 |
| 2021/0300412 A1* | 9/2021 | Dingli | B60W 50/0098 |
| 2022/0224963 A1* | 7/2022 | Herz | G06Q 50/30 |
| 2022/0255523 A1* | 8/2022 | Chu | H04R 3/00 |
| 2022/0270180 A1* | 8/2022 | Leise | G06N 20/00 |

FOREIGN PATENT DOCUMENTS

| | | | |
|---|---|---|---|
| JP | H08298613 A | 11/1996 | |
| JP | 2002039854 A | 2/2002 | |
| JP | 2002340863 A | 11/2002 | |
| JP | 2010188885 A | 9/2010 | |
| JP | 2011046256 | 3/2011 | |
| JP | 2011242303 A | 12/2011 | |
| JP | 2018517978 A | 7/2018 | |
| JP | 2019189069 A | 10/2019 | |
| JP | 2020015494 A | 1/2020 | |
| JP | 2020152372 A | 9/2020 | |

* cited by examiner

AUDIO-BASED TECHNIQUE TO SENSE AND DETECT THE ROAD CONDITION FOR AUTONOMOUS DRIVING VEHICLES

TECHNICAL FIELD

Embodiments of the present disclosure relate generally to operating autonomous driving vehicles. More particularly, embodiments of the disclosure relate to detecting a road condition for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Detecting the condition of road surface is crucial. For different road conditions, different driving strategies and different actions may be adopted for driving safety. However, it is difficult to sense and detect the road conditions. Optical sensors such as cameras and LiDAR are not able to detect certain road surface conditions, for example, the thickness of the snow and the depth of the water covering the road. The problem is more severe in the dark environment.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, microphone(s) mounted inside tires/wheel hubs or at a body of an ADV are used to collect the friction sound between the wheels and the road surface. The frequency-domain, time-domain and energy features are evaluated using machine learning and deep learning models. The surface type (e.g., dry, wet, icy) and pavement condition (e.g., asphalt, rocky, sandy) are determined, and a depth of the road covering (e.g., snow, water) is determined or estimated. A friction coefficient of pavement may be calculated accordingly, and the information is used for an optimization of control and path planning. In this way, an all-weather capability to sense, detect and determine a road condition is enabled. The road condition includes a surface type of the road, a pavement condition of the road, a depth of the road covering, etc. Different types and various levels of the road condition may be determined based on sound signals collected by microphone(s) mounted at the ADV. The ADV may generate control commands (e.g., throttle, brake, steering control commands) considering the detected road condition.

According to some embodiments, sound signals are received by one or more microphones disposed at an ADV. The sound signals are analyzed to extract a feature of a road on which the ADV is driving. A road condition of the road is determined based on the extracted feature. A path planning and speed planning is performed to generate a trajectory based on the road condition. The ADV is controlled to drive autonomously according to the generated trajectory.

Figure 1:
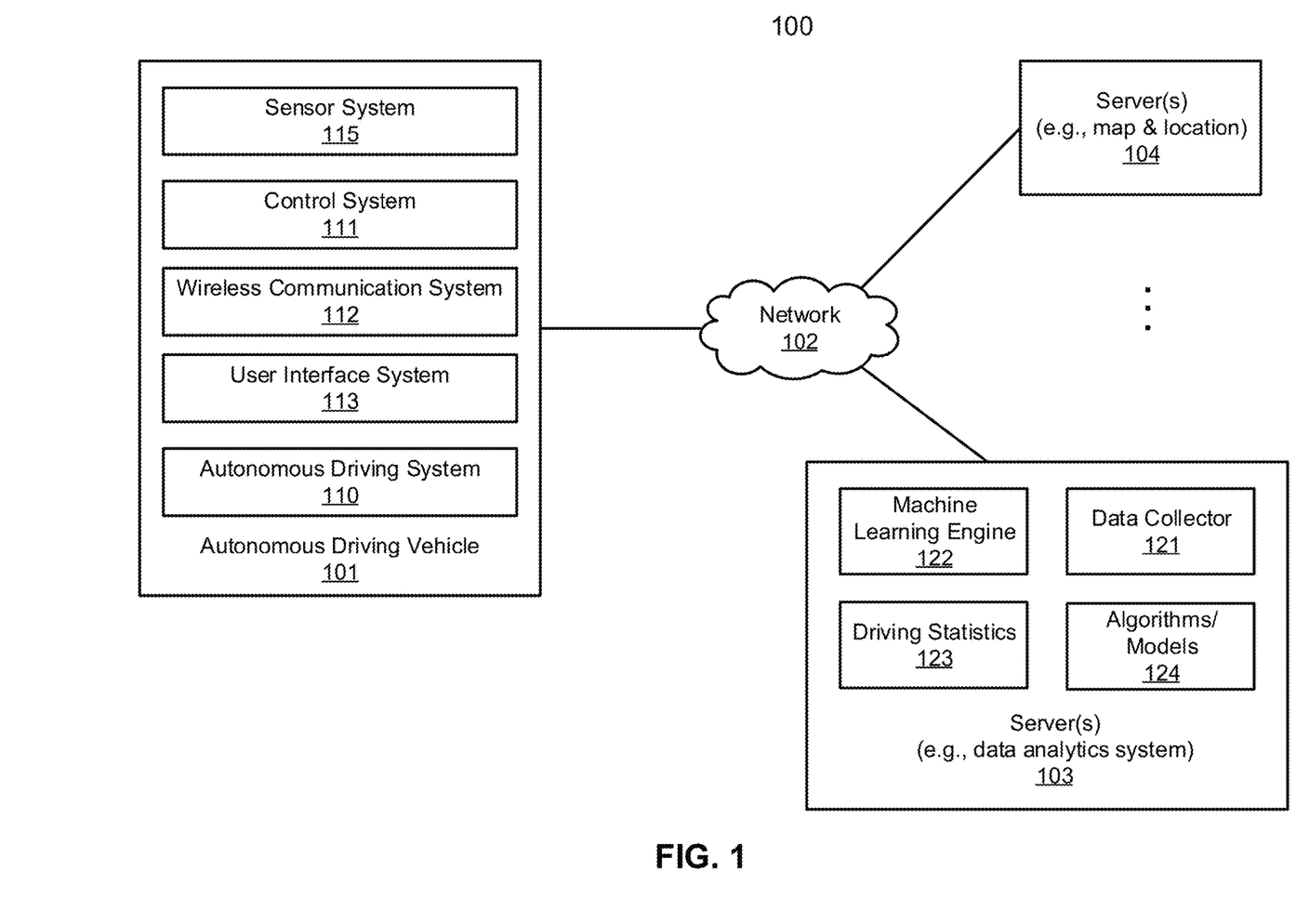
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
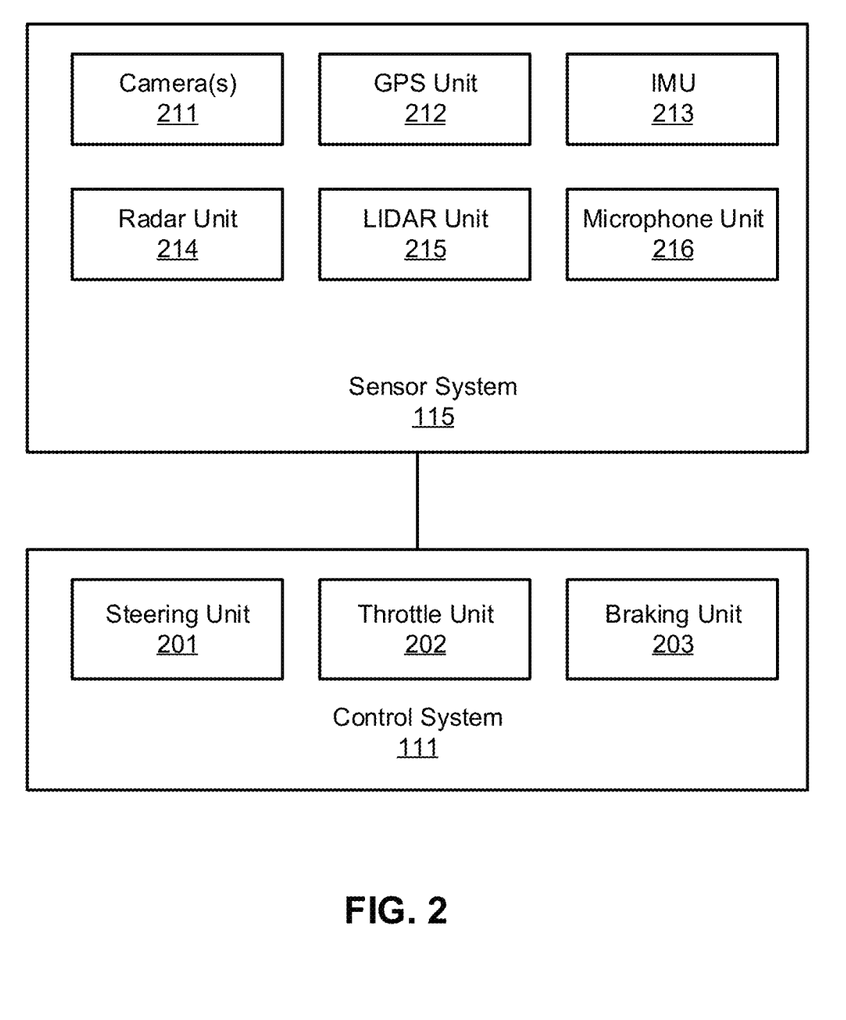
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, a light detection and range (LIDAR) unit 215, and a microphone unit 216. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform. Microphone unit 216 may include one or more microphones mounted inside tires or wheel hubs of the ADV, or at a bottom panel of the ADV. The one or more microphones may be disposed to collect sound signals from the road to detect a road condition.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to receive sound signals by one or more microphones disposed at the ADV, an algorithm or model to analyze the sound signals to extract a feature of a road on which the ADV is driving, an algorithm or model to determine a road condition of the road based on the extracted feature, an algorithm or model to generate a trajectory based on the road condition, and an algorithm or model to control the ADV to drive autonomously according to the generate trajectory. Algorithms 124 can then be uploaded on ADVs to be utilized during autonomous driving in real-time.

Figure 3:
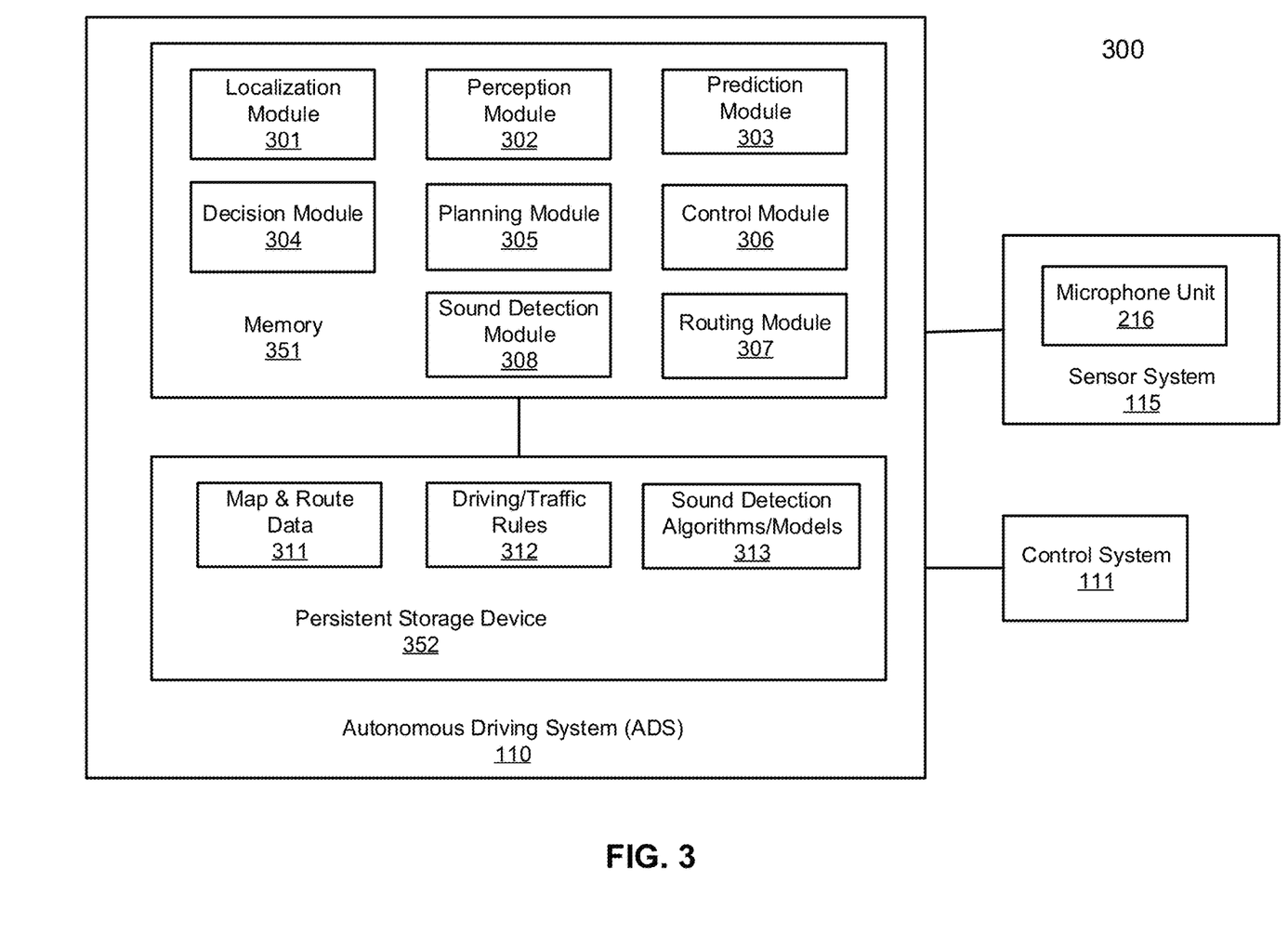
FIGS. 3-4 are block diagrams illustrating an example of an autonomous driving system used with an autonomous driving vehicle according to one embodiment.
Figure 4:
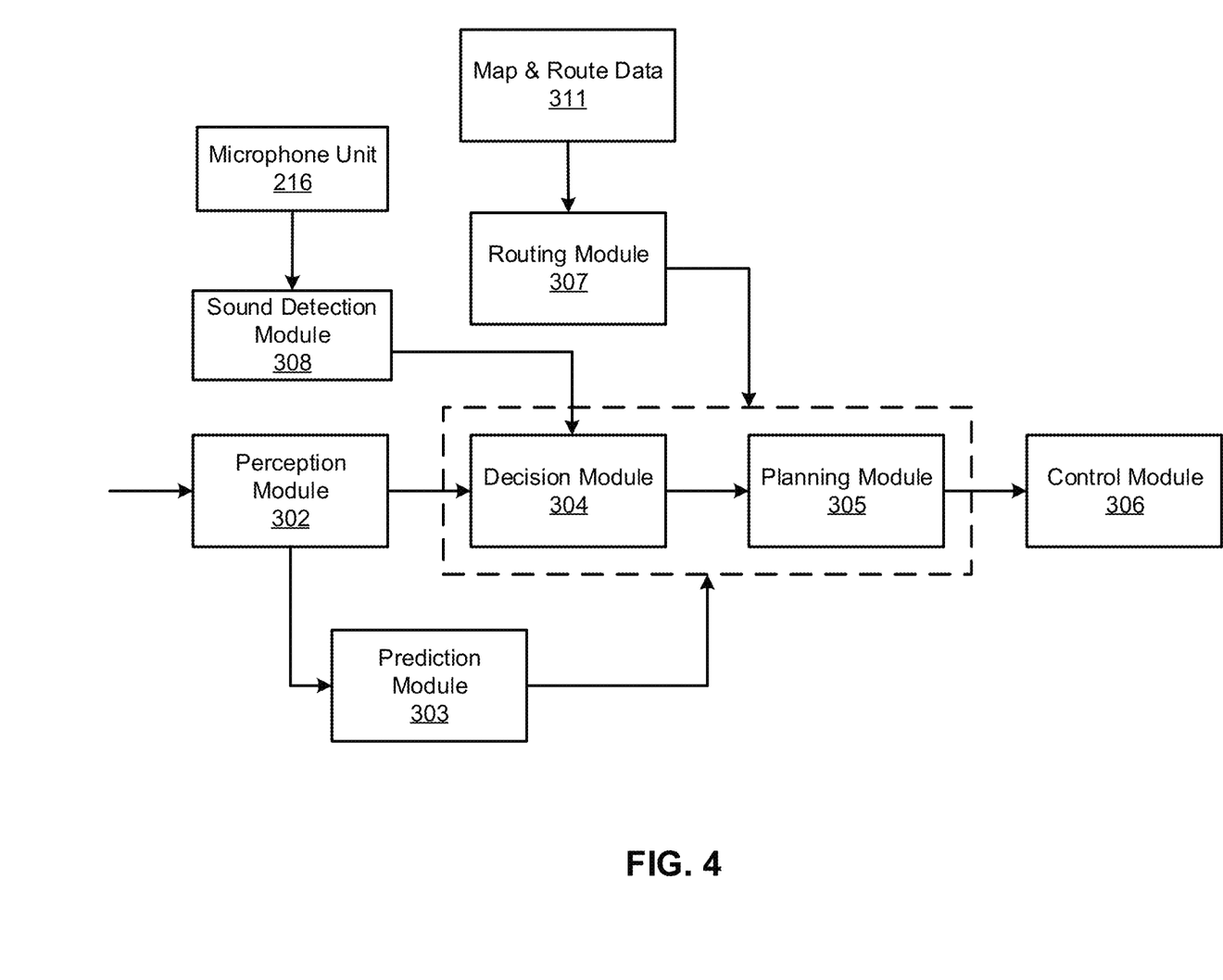

FIGS. 3-4 are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3-4, ADS 110 includes, but is not limited to, localization module 301, perception module 302, prediction module 303, decision module 304, planning module 305, control module 306, routing module 307, and sound detection module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

Based on sound signals provided by microphone unit 216, a road condition of the road on which the ADV is driving is determined by sound detection module 308. The road condition may include surface type (e.g., dry, wet, icy), pavement condition (e.g., asphalt, rocky, sandy), a depth of the road covering (e.g., snow, water), etc. Sound detection module 308 may include a computer audio system or functionalities of a computer audio system. Sound detection module 308 may process and analyze sound signals captured by one or more microphones based on sound detection algorithms or models 313, or algorithms or models 124. Frequency and energy features of the sound signals may be evaluated using machine learning algorithm or models and/or deep learning algorithm or models. The sound detection algorithms or models 313 may include machine learning algorithm or models and/or deep learning algorithm or models. The road condition may be determined based on the frequency and energy features of the sound signals. Although sound detection module 308 is shown as a separate module, sound detection module 308 may also be implemented as a part of perception module 302, prediction module 303, and/or decision module 304. Alternatively, sound detection module 308 may be a separate module communicatively coupled to modules 302-306, for example, via an application programming interface (API).

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 5:
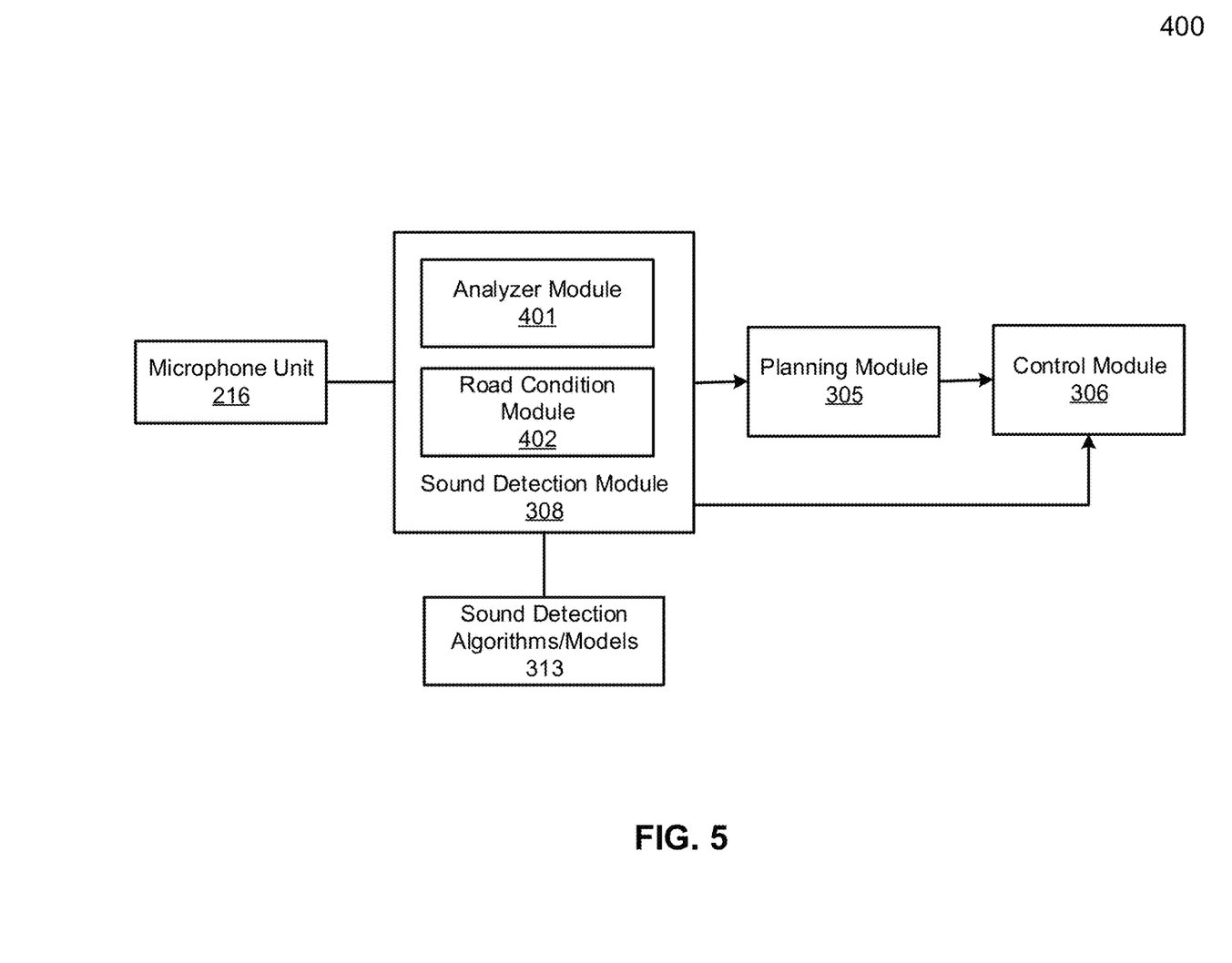
FIG. 5 is a block diagram illustrating an example of a sound detection module of an autonomous driving vehicle according to one embodiment.

FIG. 5 is a block diagram illustrating an example of a sound detection module 308 of an autonomous driving vehicle according to one embodiment. Referring to FIG. 6, sound detection module 308 includes, but is not limited to, analyzer module 401, road condition module 402, which work together using sound detection algorithms or models 313 to detect a road condition of a road on which an ADV is driving. The planning module 305 plans a trajectory based on the detected road condition. The control module 305 controls the ADV to drive autonomously according to the planned trajectory. In one embodiment, the control module 305 controls the ADV to drive autonomously further according to the detected road condition.

In one embodiment, sound signals are received by one or more microphones in the microphone unit 216 disposed at the ADV. Based on sound signals from the one or more microphones, analyzer module 401 is configured to analyze the sound signals to extract a feature of the road. In one embodiment, analyzer module 401 is configured to extract a frequency feature of the road. In one embodiment, analyzer module 401 is configured to extract a temporal feature of the road. In one embodiment, analyzer module 401 is configured to extract a power spectrum of the road. In one embodiment, analyzer module 401 is configured to extract the feature of the road based on a machine learning algorithm or model or a deep learning algorithm or model.

In one embodiment, road condition module 402 is configure to determine the road condition based on the extracted feature. In one embodiment, road condition module 402 is configure to determine a surface type of the road. In one embodiment, road condition module 402 is configure to determine a pavement condition of the road. In one embodiment, road condition module 402 is configure to determine a depth of a covering of the road. In one embodiment, road condition module 402 is configure to determine a friction coefficient of the road based on the extracted feature.

In one embodiment, control module 306 may generate an optimized control command to increase the driving safety. As an example, when the surface type is wet and the friction coefficient is less than a predetermined threshold, control module 306 may generate early and/or gentle braking commands based on the road condition. As another example, when the surface type is wet and the friction coefficient is less than a predetermined threshold, control module 306 may generate slow and/or gentle steering commands based on the road condition.

Figure 6:
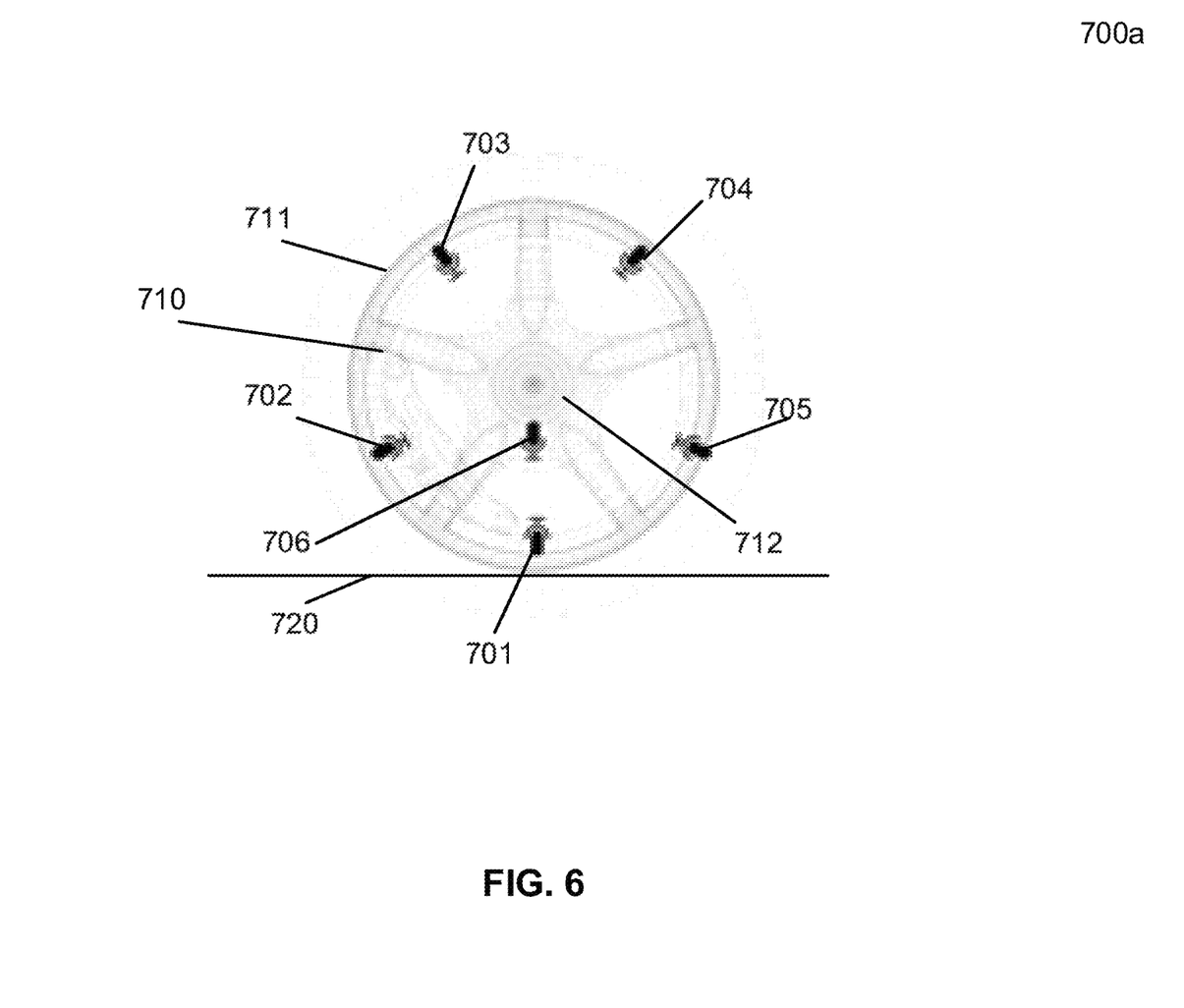
FIG. 6 is a diagram illustrating an example of an autonomous driving vehicle with a sound detection module according to one embodiment.

FIG. 6 is a diagram 700a illustrating an example of an autonomous driving vehicle with a sound detection module (e.g., module 308) according to one embodiment. Detecting and determining a road condition is important for operating an ADV. Previous efforts mainly use optical/visual sensing to distinguish among different road conditions. However, due to the characteristics of optical sensors, such approaches have significant limitation in providing stable and accurate detection in the dark. Moreover, visual solutions are not able to detect a level of certain road conditions, e.g., the thickness of the snow and the depth of the water covering the road. Disclosed here is an ADV with the sound detection module (e.g., module 308) to sense and detect the road conditions based on sound signals, for example, friction sound signals between the ADV and the road surface.

Referring to FIG. 6, one or more microphones (e.g., 701-706) may be mounted inside tires 711 or wheel hubs 712 of the ADV to detect sound signals from a road (e.g., 720) on which the ADV is driving. In one embodiment, one microphone (e.g., 701) may be mounted at each tire (e.g., 711) of the ADV to detect the sound signals from a friction between each wheel (e.g., 710) of the ADV and the surface of the road (e.g., 720). In one embodiment, at least two microphones (e.g., 701-705) may be mounted at each tire (e.g., 711) of the ADV to detect the sound signals from the friction between each wheel (e.g., 710) of the ADV and the surface of a road. The sound signals from the at least two microphones may have a reduced noise by applying averaging algorithms or other noise reducing algorithms. In one embodiment, a microphone (e.g., 706) may be mounted at a hub (e.g., 712) of each wheel (e.g., 710) of the ADV to detect the sound signals from a friction between each wheel of the ADV and the surface of a road. In one embodiment, at least two microphones may be mounted at the hub (e.g., 712) of each wheel (e.g., 710) of the ADV to detect the sound signals from a friction between each wheel of the ADV and the surface of a road. The one or more microphones (e.g., 701-706) may be mounted close to the surface of the road, but not in direct contact with the surface of the road (e.g., 720).

Figure 7:
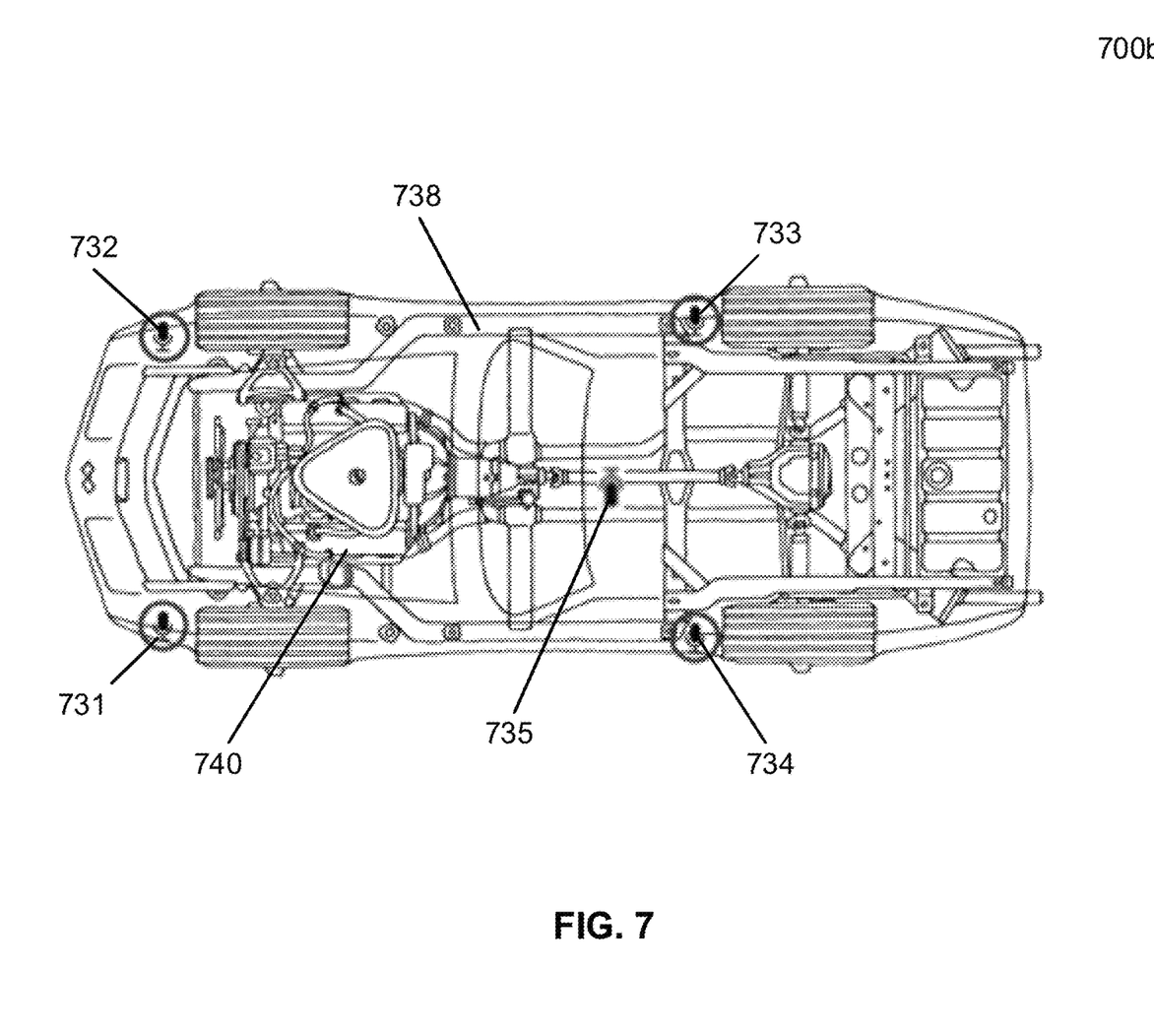
FIG. 7 is a diagram illustrating another example of an autonomous driving vehicle with a sound detection module according to one embodiment.

FIG. 7 is a diagram 700b illustrating another example of an autonomous driving vehicle with a sound detection module according to one embodiment. Referring to FIG. 7, one or more microphones (e.g., 731-735) may be mounted at a bottom panel (e.g., 738) of an ADV (e.g., 740) to detect sound signals from a road on which the ADV is driving. In one embodiment, one microphone (e.g., 731, 732) may be mounted at each side of the ADV (e.g., 740) to detect the sound signals from a friction between the ADV (e.g., 740) and the surface of the road. In one embodiment, at least two microphones (e.g., 731, 734) may be mounted at each side of the ADV (e.g., 740) to detect the sound signals from a friction between the ADV and the surface of the road. The sound signals from the at least two microphones may have a reduced noise by applying averaging algorithms or other noise reducing algorithms. In one embodiment, one microphone (e.g., 731, 732) may be mounted at each corner of the ADV to detect the sound signals from a friction between the ADV (e.g., 740) and the surface of the road. In one embodiment, a microphone (e.g., 735) may be mounted at a center of the bottom panel (e.g., 738) of the ADV (e.g., 740) to detect the sound signals from a friction between the ADV and the surface of a road. The one or more microphones (e.g., 731-735) may be mounted close to the surface of the road, but not in direct contact with the surface of the road.

Figure 8:
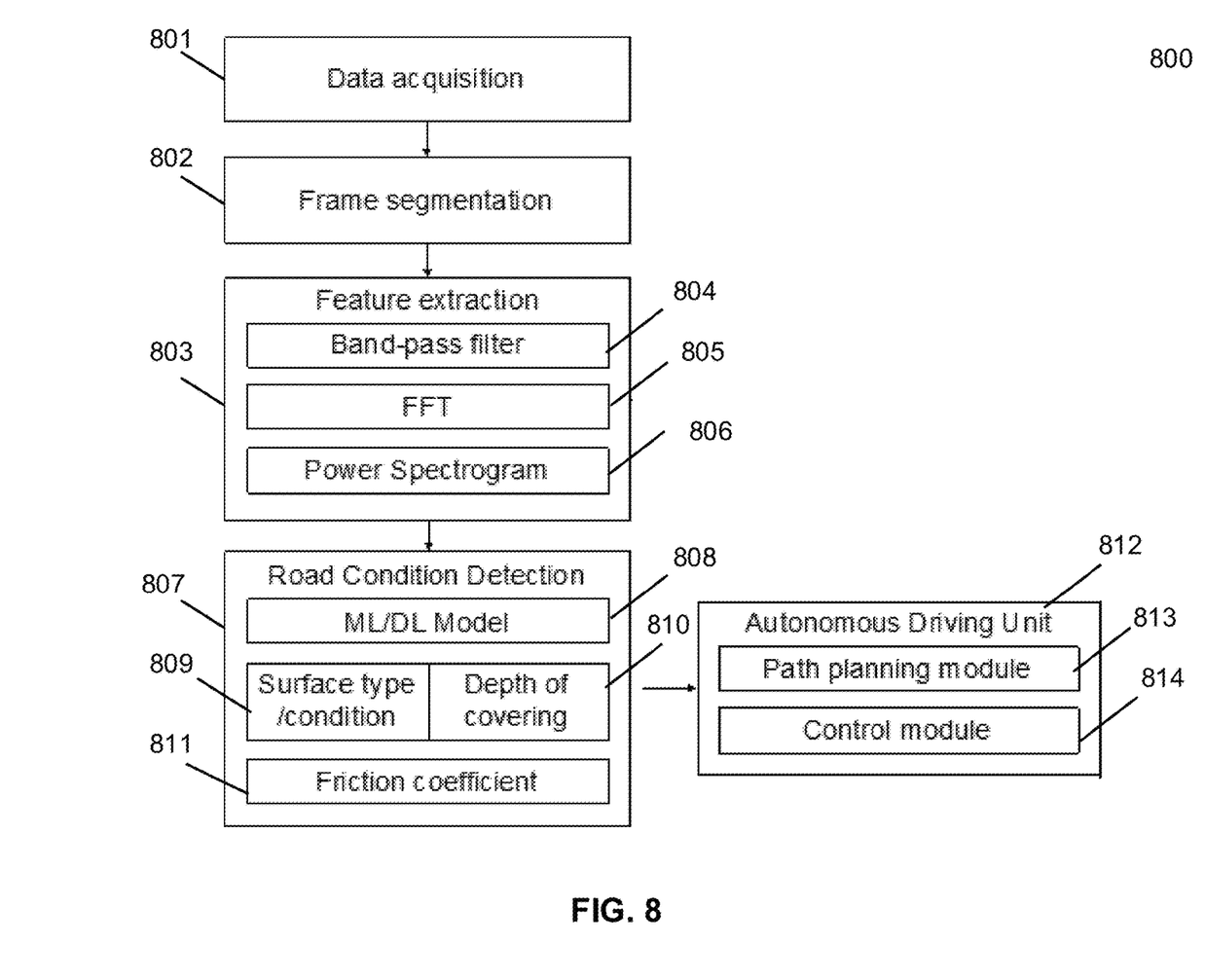
FIG. 8 is a flow diagram illustrating an example of a method for determining a road condition based on sound detection for operating an ADV according to one embodiment.

FIG. 8 is a flow diagram illustrating an example of determining a road condition based on sound detection for operating an ADV according to one embodiment. As discussed above, one or more microphones mounted inside tires/wheel hubs or at a bottom panel of the ADV are used to collect friction sound signals between the ADV and a road surface of a road on which the ADV is driving. At block 801, the sound signals are received or acquired by the one or more microphones disposed at the ADV. For example, the sound signals include the friction sound signals between the ADV and the road surface of the road on which the ADV is driving.

At block 802, the sound signals are segmented into different frames for further processing. At block 803, the sound signals are analyzed to extract a feature of the road. For example, the sound signals may pass a band-pass filter to filter out the unwanted noises, as illustrate at block 804. The band-pass filter may have a first predetermined threshold and a second predetermined threshold. The sound signals below the first predetermined threshold and above the second predetermined threshold may be filtered out.

In one embodiment, a frequency feature of the road may be extracted based on the sound signals received by the microphones, for example, by applying a fast Fourier transform (FFT) to the sound signals, as illustrated at block 805. An FFT is an algorithm that computes the discrete Fourier transform (DFT) of a sequence, or its inverse (IDFT). Fourier analysis converts a signal from its original domain (often time or space) to a representation in the frequency domain and vice versa. The frequency feature of the road may correspond to certain road conditions. In one embodiment, a temporal feature of the road may be extracted based on the sound signals received by the microphones, for example, zero crossing rate, amplitude, short-term energy, cyclicity, smoothness, etc.

In one embodiment, a power spectrogram of the road may be extracted based on the sound signals received by the microphones, as illustrated at block 806. A spectrogram is a visual representation of the spectrum of frequencies of a signal as it varies with time. A power spectrogram represents a power level of a signal in each frequency band over time. The power spectrogram of the road may correspond to certain road conditions.

In one embodiment, a power spectrum of the road may be extracted based on the sound signals received by the microphones. A power spectrum represents a power level of a signal in each frequency band. The power distribution over frequency will be different for different road conditions. In one embodiment, some other features may be automatically extracted by machine learning/deep learning algorithms/models, e.g. neural networks.

At block 807, the road condition of the road may be determined based on the extracted feature, for example, the extracted frequency feature, the extracted temporal feature, the extracted power spectrogram of the road, or the extracted power spectrum of the road. Different road conditions may correspond to different extracted features. Because the power distribution over frequency and the time-domain characteristics of the sound wave will be different for different road conditions, the road condition of the road may be determined based on the extracted temporal feature, the extracted frequency feature, the extracted power spectrogram, or the extracted power spectrum of the road.

In one embodiment, the road condition may be determined based on a machine learning algorithm or a deep learning algorithm, as illustrated at block 808. For example, a classification model may be used to determine the road type and pavement condition, a regression algorithm may be used to determine the depth of the road covering. For example, the extracted frequency feature and the extracted power spectrogram of the road may be processed by convolutional neural network (CNN) algorithms.

In one embodiment, a surface type and/or pavement condition of the road may be determined based on the extracted feature, as illustrated at block 809. For example, the surface type of the road may include, but is not being limited to, dry surface, wet surface, icy surface, snowy surface, etc. For example, the pavement condition of the road may include, but is not being limited to, asphalt, rock, sand, dirt, etc.

In one embodiment, a depth of a covering of the road may be determined based on the extracted feature, as illustrated at block 810. For example, the covering of the road may include, but is not being limited to, water, snow, sand, etc. For example, the depth of water or snow may be 0.1, 0.2, 0.3, 0.5, 0.6, 0.7, 0.8, 0.9, 1 meter or any values therebetween.

In one embodiment, a friction coefficient of the road may be determined based on the extracted feature, as illustrated at block 811. For example, the friction coefficient of the road may be determined based on the surface type, pavement condition, or the depth of the covering of the road. For example, in one embodiment, the friction coefficient of the road may be determined using rule-based methods. For example, in one embodiment, the friction coefficient of the road may be determined using machine learning/deep learning methods (e.g. regression models).

At block 812, the information about the road condition, e.g., the surface type, the pavement condition, the friction coefficient, may be input into the autonomous driving unit (e.g., ADS 110 described in connection with FIGS. 3A-3B).

In one embodiment, planning module 305 may perform a path planning and speed planning to generate a trajectory based on the road condition. The detected road conditions may be used for the optimization of path planning and speed planning. As an example, when the surface type is wet and the friction coefficient is less than a predetermined threshold, the road may be slippery. Thus, planning module 305 may generate a trajectory by adjusting driving strategy, for example, changing a path or lowering a speed based on the road condition, thereby increasing driving safety.

At block 814, control module may control the ADV to autonomously drive according to the planned trajectory to improve driving safety. As an example, when the surface type is wet and the friction coefficient is less than a predetermined threshold, the road may be slippery. Thus, control module may generate commands by adjusting driving strategy, for example, applying early and gentle brake in needs of stop, or generating slow and gentle steering commands based on the road condition, thereby increasing driving safety.

Figure 9:
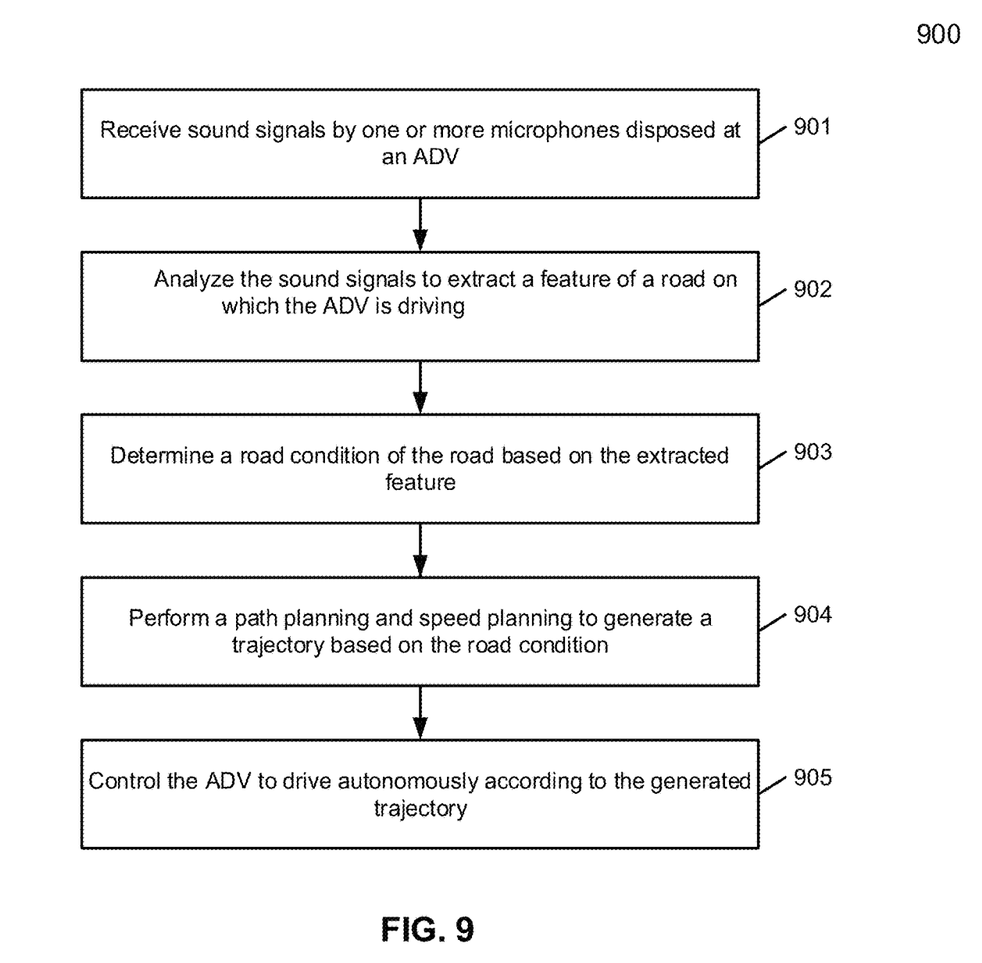
FIG. 9 is a flow diagram illustrating an example of a process for determining a road condition based on sound detection for operating an ADV according to one embodiment.

FIG. 9 is a flow diagram illustrating an example of a process 900 for determining a road condition based on sound detection for operating an ADV according to one embodiment. Process 900 may be performed by processing logic which may include software, hardware, or a combination thereof. For example, process 900 may be performed by microphone unit 216, sound detection module 308, planning module 305 and control module 306. By this process, the road condition including a surface type, a pavement condition, a depth of a covering of the road, and/or a friction efficient of the road may be detected based on sound signals. Thus, an all-weather capability to detect the road condition is enabled, thereby a driving safety is improved.

Referring to FIG. 9, in operation 901, processing logic receives sound signals by one or more microphones disposed at the ADV. In one embodiment, the one or more microphones are disposed inside tires or wheel hubs. In one embodiment, the one or more microphones are disposed at a bottom panel of the ADV.

In operation 902, processing logic analyzes the sound signals to extract a feature of a road on which the ADV is driving. In one embodiment, processing logic analyzes the sound signals to extract a frequency feature of the road. In one embodiment, processing logic analyzes the sound signals to extract a power spectrogram of the road. In one embodiment, processing logic analyzes the sound signals to extract a time-domain feature of the road. In one embodiment, processing logic analyzes the sound signals to extract a power spectrum of the road. In one embodiment, processing logic analyzes the sound signals to automatically extract other related features of the road.

In operation 903, processing logic determines a road condition of the road based on the extracted feature. The extracted feature may include the extracted frequency feature, the extracted time-domain feature, the extracted power spectrogram of the road, or the extracted power spectrum of the road. The extracted feature may include a feature extracted by machine learning or deep learning algorithms.

In one embodiment, processing logic determines the road condition based on a machine learning algorithm or a deep learning algorithm. In one embodiment, processing logic determines a surface type of the road based on the extracted feature. In one embodiment, processing logic determines a pavement condition of the road based on the extracted feature. In one embodiment, processing logic determines a depth of a covering of the road based on the extracted feature. In one embodiment, processing logic determines a friction coefficient of the road based on the extracted feature.

In operation 904, processing logic performs a path planning and speed planning to generate a trajectory based on the road condition. The detected road conditions may be used for the optimization of path planning and speed planning. As an example, when the surface type is wet and the friction coefficient is less than a predetermined threshold, the road may be slippery. Thus, processing logic generates the trajectory by adjusting a driving strategy to increase a driving safety. In one embodiment, processing logic lower a speed based on the road condition. In one embodiment, processing logic change a path based on the road condition.

In operation 905, processing logic controls the ADV to drive autonomously according to the generated trajectory. In this way, the driving strategy is adjusted based on the detected road conditions, and therefore, the driving safety is improved.

In one embodiment, processing logic controls the ADV to drive autonomously further according to the detected road condition. Processing logic may generate an optimized control command to increase the driving safety. As an example, when the surface type is wet and the friction coefficient is less than a predetermined threshold, processing logic may generate early and/or gentle braking commands based on the road condition. As another example, when the surface type is wet and the friction coefficient is less than a predetermined threshold, processing logic may generate slow and/or gentle steering commands based on the road condition.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   receiving sound signals by one or more microphones disposed at the ADV, comprising:
   detecting the sound signals from a friction between each wheel of the ADV and a surface of a road, at least two microphones of the one or more microphones being mounted at a hub of each wheel of the ADV, the sound signals from the at least two microphones having a reduced noise by applying a noise reducing algorithm;
   analyzing the sound signals to extract a feature representing the road on which the ADV is driving, comprising:
   extracting a power spectrogram of the road based on the sound signals, the power spectrogram representing a power level of a signal of the sound signals in each frequency band over time and corresponding to a road condition of the road;
   determining the road condition of the road based on the extracted feature, comprising:
   determining a pavement condition of the road based on the extracted feature, the pavement condition including an asphalt condition, a rocky condition, or a sandy condition;
   determining a depth of a covering of the road based on the extracted feature, the depth of the covering of the road including a depth of water, snow, or sand on the road; and
   determining a friction coefficient of the road based on at least one of a surface type, the pavement condition, or the depth of the covering of the road by using regression models in a machine learning algorithm;
   performing a path planning and speed planning to generate a trajectory based on the road condition, comprising:
   performing at least one of changing a path or lowering a speed of the ADV, in response to that the surface type is a wet surface and the friction coefficient is less than a predetermined threshold; and
   controlling the ADV to drive autonomously according to the generated trajectory.

2. The method of claim 1, wherein the one or more microphones are disposed inside tires or wheel hubs.

3. The method of claim 1, wherein the one or more microphones are disposed at a bottom panel of the ADV.

4. The method of claim 1, wherein analyzing the sound signals to extract the feature of the road comprises analyzing the sound signals to extract a frequency feature representing a roughness of the surface of the road.

5. The method of claim 1, wherein determining the road condition comprises determining the road condition using the machine learning algorithm or a deep learning algorithm.

6. The method of claim 1, wherein determining the road condition based on the extracted feature comprises determining at least one of a surface type of the road or the pavement condition based on the extracted feature.

7. The method of claim 1, wherein determining the road condition based on the extracted feature comprises determining the friction coefficient representing a friction between one or more tires of the ADV and the surface of the road based on the extracted feature.

8. A non-transitory machine-readable medium having instructions stored therein, which when executed by a processor, cause the processor to perform operations of operating an autonomous driving vehicle (ADV), the operations comprising:
receiving sound signals by one or more microphones disposed at the ADV, comprising:
detecting the sound signals from a friction between each wheel of the ADV and a surface of a road, at least two microphones of the one or more microphones being mounted at a hub of each wheel of the ADV, the sound signals from the at least two microphones having a reduced noise by applying a noise reducing algorithm;
analyzing the sound signals to extract a feature representing the road on which the ADV is driving, comprising:
extracting a power spectrogram of the road based on the sound signals, the power spectrogram representing a power level of a signal of the sound signals in each frequency band over time and corresponding to a road condition of the road;
determining the road condition of the road based on the extracted feature, comprising:
determining a pavement condition of the road based on the extracted feature, the pavement condition including an asphalt condition, a rocky condition, or a sandy condition;
determining a depth of a covering of the road based on the extracted feature, the depth of the covering of the road including a depth of water, snow, or sand on the road; and
determining a friction coefficient of the road based on at least one of a surface type, the pavement condition, or the depth of the covering of the road by using regression models in a machine learning algorithm;
performing a path planning and speed planning to generate a trajectory based on the road condition, comprising:
performing at least one of changing a path or lowering a speed of the ADV, in response to that the surface type is a wet surface and the friction coefficient is less than a predetermined threshold; and
controlling the ADV to drive autonomously according to the generated trajectory.

9. The machine-readable medium of claim 8, wherein the one or more microphones are disposed inside tires or wheel hubs.

10. The machine-readable medium of claim 8, wherein the one or more microphones are disposed at a bottom panel of the ADV.

11. The machine-readable medium of claim 8, wherein analyzing the sound signals to extract the feature of the road comprises analyzing the sound signals to extract a frequency feature representing a roughness of the surface of the road.

12. The machine-readable medium of claim 8, wherein determining the road condition comprises determining the road condition using the machine learning algorithm or a deep learning algorithm.

13. The machine-readable medium of claim 8, wherein determining the road condition based on the extracted feature comprises determining at least one of a surface type of the road or the pavement condition based on the extracted feature.

14. The machine-readable medium of claim 8, wherein determining the road condition based on the extracted feature comprises determining the friction coefficient representing a friction between one or more tires of the ADV and the surface of the road based on the extracted feature.

15. A data processing system, comprising:
a processor; and
a memory coupled to the processor to store instructions, which when executed by the processor, cause the processor to perform operations of operating an autonomous driving vehicle (ADV), the operations including
receiving sound signals by one or more microphones disposed at the ADV, comprising:
detecting the sound signals from a friction between each wheel of the ADV and a surface of a road, at least two microphones of the one or more microphones being mounted at a hub of each wheel of the ADV, the sound signals from the at least two microphones having a reduced noise by applying a noise reducing algorithm;
analyzing the sound signals to extract a feature representing the road on which the ADV is driving, comprising:
extracting a power spectrogram of the road based on the sound signals, the power spectrogram representing a power level of a signal of the sound signals in each frequency band over time and corresponding to a road condition of the road;
determining the road condition of the road based on the extracted feature, comprising:
determining a pavement condition of the road based on the extracted feature, the pavement condition including an asphalt condition, a rocky condition, or a sandy condition;
determining a depth of a covering of the road based on the extracted feature, the depth of the covering of the road including a depth of water, snow, or sand on the road; and
determining a friction coefficient of the road based on at least one of a surface type, the pavement condition, or the depth of the covering of the road;
performing a path planning and speed planning to generate a trajectory based on the road condition, comprising:
performing at least one of changing a path or lowering a speed of the ADV, in response to that the surface type is a wet surface and the friction coefficient is less than a predetermined threshold; and
controlling the ADV to drive autonomously according to the generated trajectory.

16. The system of claim 15, wherein the one or more microphones are disposed inside tires or wheel hubs.

* * * * *